United States Patent [19]

Kleier

[11] Patent Number: 5,324,054
[45] Date of Patent: Jun. 28, 1994

[54] METHOD OF DISPERSING USED CARTONS

[75] Inventor: Bob E. Kleier, Wellsville, Kans.

[73] Assignee: Kleier Investments, Inc., Gardner, Kans.

[21] Appl. No.: 57,562

[22] Filed: May 6, 1993

Related U.S. Application Data

[63] Continuation of Ser. No. 773,014, Oct. 8, 1991, abandoned.

[51] Int. Cl.$^5$ ............................................... B62B 3/00
[52] U.S. Cl. ................................. 280/79.2; 280/79.3; 220/485
[58] Field of Search ................. 280/79.11, 79.2, 79.3, 280/79.5, 47.34; 220/485, 661

[56] References Cited

U.S. PATENT DOCUMENTS

| | | | |
|---|---|---|---|
| 3,240,507 | 3/1966 | Braun | 280/79.3 |
| 3,288,484 | 11/1966 | Brunette | 280/79.2 |
| 4,180,277 | 12/1979 | Romero | 280/79.3 |
| 4,222,579 | 9/1980 | Frydendal | 280/79.3 |

FOREIGN PATENT DOCUMENTS

| | | | |
|---|---|---|---|
| 0232390 | 1/1961 | Australia | 220/485 |
| 2627142 | 8/1989 | France | 280/79.3 |

*Primary Examiner*—Margaret A. Focarino
*Assistant Examiner*—Peter English
*Attorney, Agent, or Firm*—Kokjer, Kircher, Bowman & Johnson

[57] ABSTRACT

A carton dispensing container having a bottom, side back and front walls which define an open-topped cavity which may receive emptied shipping cartons. The bottom and walls may each be formed as rigid peripheral frames with a support lattice mounted thereon to reduce weight and allow viewing the cartons. The bottom may mount wheels to allow the container to be easily moved. The front wall is formed of a front bottom wall and a front top wall which are spaced from each other to form an access opening in the front wall into the cavity. The access opening is sized such that the carton will not readily fall from the opening, yet may be easily removed via the opening.

6 Claims, 1 Drawing Sheet

METHOD OF DISPERSING USED CARTONS

This is a continuation of application Ser. No. 07/773,014, filed Oct. 8, 1991, now abandoned.

BACKGROUND OF THE INVENTION

1. Field of the Invention

The present invention relates in general to dispensing devices. In particular, the present invention relates to a container for the dispensing of empty shipping cartons to secondary users.

2. Description of the Related Art

It has been known for many years that retail vendors, such as grocery stores, typically receive their stock in cartons which are useful for many other purposes, and may thus extend their useful life. These cartons typically take the form of cardboard boxes which may be used, after they are emptied, for the storage or transport of many items, which helps to save resources which would be spent on first-use packaging material. Such items may even include the items purchased from the retailer, where these items are too heavy for standard sacks or bags. While the utility of such cartons for their intended and secondary uses have been recognized, there have been many obstacles to the distribution, after unpacking, of such cartons for their secondary use.

In most retail establishments such cartons, containing their initial contents, are received from a back entrance and are emptied at, or returned after emptying to, a centralized location which allows inventory control. This location is typically concealed from the average purchasing consumer. This in itself poses an obstacle to distribution to secondary users. Such centralized locations also usually employ equipment for transport of the cartons which could cause injury to untrained persons, prompting restricted access to such areas to avoid liability for injury. Placing the cartons in an area accessible to customers uses valuable floor space which could be used for sales and increases labor costs due to moving the cartons to such area and stacking them in a stable configuration. Such a stack is unsightly and poses a danger of falling, which could subject the store owner to liability.

SUMMARY OF THE INVENTION

An object of the present invention is to provide an apparatus which allows a retail business to offer emptied shipping cartons to customers for secondary uses.

Another object of the present invention is to provide an apparatus which allows easy transport of such cartons to a location accessible by consumers.

A further object of the present invention is to provide an apparatus which will securely retain, yet easily dispense, such cartons.

These and other objects of the present invention are achieved by a carton dispensing container having a bottom, side, back and front walls which define an open-topped cavity which may receive emptied shipping cartons. The bottom and walls may each be formed as rigid peripheral frames with a support lattice mounted thereon to reduce weight and allow viewing the cartons. The bottom may mount wheels to allow the container to be easily moved. The front wall is formed of a front bottom wall and a front top wall which are spaced from each other to form an access opening in the front wall into the cavity. The access opening is sized such that the carton will not readily fall from the opening, yet may be easily removed via the opening.

BRIEF DESCRIPTION OF THE DRAWINGS

The objects and features of the invention noted above are explained in more detail below with reference to the drawings, in which like reference numerals denote like elements, and in which.

DETAILED DESCRIPTION OF THE INVENTION

Figure 3:
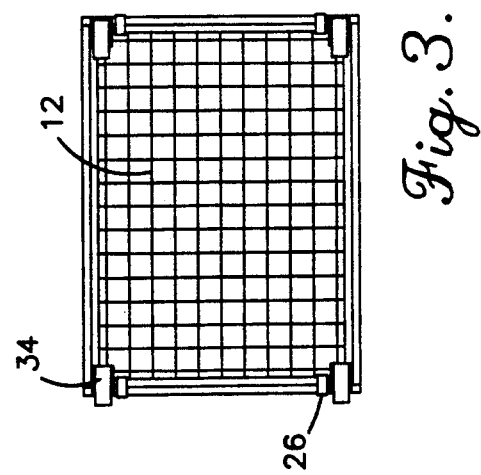
FIG. 3 is a bottom view of the apparatus of FIG. 1.

With reference to the drawings, the apparatus according to the present invention is generally designated by reference numeral 10. The apparatus 10 generally consists of a bottom 12, side walls 14, rear wall 16 and front wall 18. The bottom and walls are preferably of rectangular configuration with the peripheral edges of these elements in contact and the walls extending upwardly from the bottom, which is substantially parallel to the ground. In this manner the bottom and walls define an interior cavity 20 which is open at the top of the apparatus 10.

The bottom and walls may be formed of similar materials. These materials are preferably a rigid metal peripheral frame 22 having a support lattice 24, formed of metal fencing, mounted thereon. The use of the support lattice reduces the weight of the apparatus 10 and allows viewing of the contents of the apparatus. While these materials are preferred, other materials could of course be used. For example, the frame and/or support lattice could be formed of plastic, and each of these elements could be molded as a monolithic unit.

The walls and bottom are fixed together by any appropriate means, including screws, nuts and bolts or welding. Various other methods could alternatively be employed, such as metal bands 26 which extend around adjacent frames 22. The means for connecting the bottom and walls together could also allow these elements to be releasably fixed, such that the apparatus 10 could be partially or fully disassembled for reduced storage space.

Figure 2:
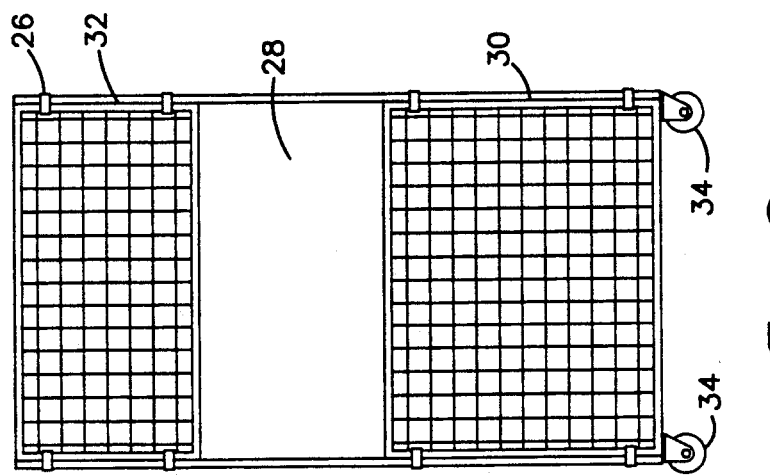
FIG. 2 is a front view of the apparatus of FIG. 1.
Figure 1:
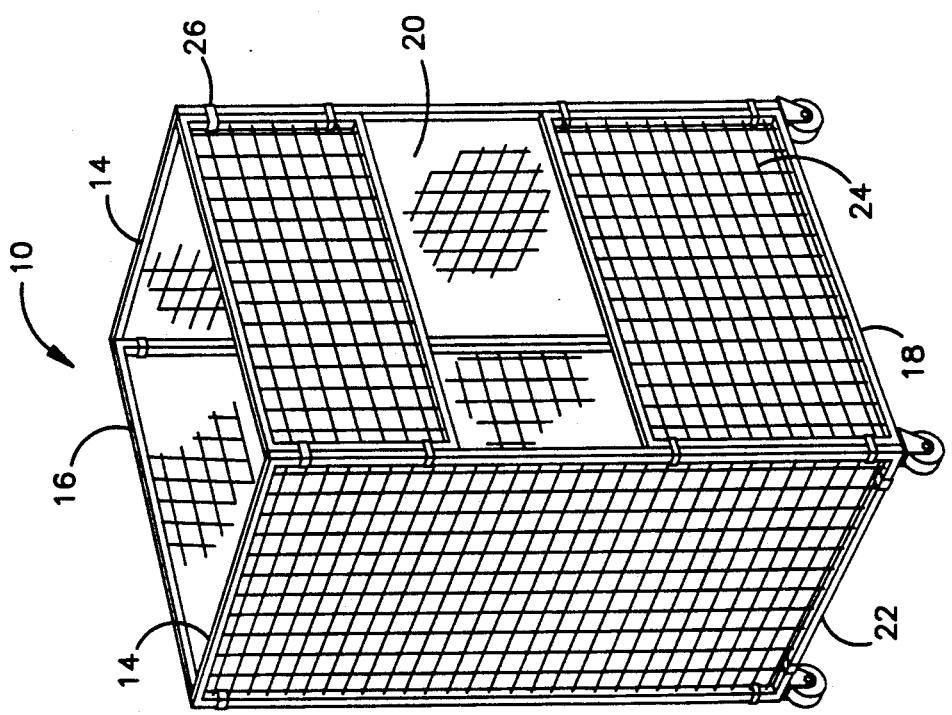
FIG. 1 is a perspective view of the apparatus according to the present invention.

As may be seen in FIGS. 1 and 2, front wall 18 is provided with an access opening 28 extending therethrough. Opening 28 may be formed within the front wall, or the front wall may be divided so as to form a bottom front wall 30 and a top front wall 32 which are spaced from each other to define the access opening 28. In either case, it is preferred that material similar to the peripheral frames surround the opening 28 to provide strength and durability.

The apparatus 10 may be stationary, but it is preferred that the apparatus allow movement with respect to the ground. To this end there may be provided wheels or casters 34 mounted at spaced positions to the lower end of the apparatus, preferably to the bottom 12. It is also preferred that some of the wheels 34 be capable of rotation about a substantially vertical axis to allow steering of the apparatus during movement, and that rotation of at least some of the wheels may be locked to prevent accidental movement.

While the above description of the apparatus will enable one of ordinary skill in the art to form an operable apparatus, certain dimensions of the apparatus have been found to be particularly useful in certain applications. In particular, where the apparatus is to be employed in a grocery store the shipping cartons will be cardboard boxes having various "medium" sizes which are well known through common experience. For such a range of carton sizes it is preferred that the apparatus have a cavity base of approximately 117 cm (46") by 61 cm (24") with a depth of approximately 183 cm (72"). To ensure that these cartons will not readily fall out of the access opening, but may be easily removed therefrom, as described more fully below, it is preferred that the access opening be located approximately 46 cm (18") from the top of the apparatus and have a height of approximately 60 cm (23.75"). From these measurements it is believed that appropriate measurements for other carton size ranges may be readily determined.

The operation of the apparatus 10 will now be explained.

The apparatus 10 will be initially located at the site where the store merchandise is removed from its shipping cartons. This may be a location near a rear entrance or loading dock, or could be the store aisle at a position adjacent to the display location for the particular merchandise. As each shipping carton is emptied of its merchandise the empty shipping carton is placed within the cavity 20 of apparatus 10. This may be by inserting the carton in the top of the apparatus or, if the level of carton within the apparatus permits, by inserting the carton into the access opening 28. The cartons will thus begin to fill the cavity 28.

However, as the cartons are smaller than the cavity, and typically cartons of different sizes will be placed within the cavity, uniform stacking of the cartons therein is unlikely, and not preferred. Specifically, corners of certain of the cartons will inevitably partially enter other cartons, and cartons will have different heights, such that the cartons are arranged in a jumble within the cavity. This jumbled arrangement helps to retain the cartons from falling out of the access opening, due to the engagement of corners, edges and other portions of the cartons against other cartons. Since the cartons are engaged with each other to a certain extent, and the access opening is partially blocked by corners edges and other portions of cartons, they are unlikely to fall freely from the access opening. However, manually pulling on a particular carton, sometimes while slightly lifting or shifting another carton, will allow such a carton to be pulled free of the jumble and through the access opening.

When there are no more cartons to place in the apparatus, or the level of cartons is approximately level with the top of the apparatus, the apparatus is moved to a location which is accessible to the store's customers or other secondary users. At this location the wheels are locked to prevent accidental movement. When a secondary user, such as a customer or a sacker at the check out counter, desires to take a carton from the apparatus the secondary user will insert their hand into the access opening 28 and pull the carton of choice therefrom.

From the foregoing it will be seen that this invention is one well adapted to attain all ends and objects hereinabove set forth together with the other advantages which are obvious and which are inherent in the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A method of reusing shipping cartons at a place of business having a product display area and a check out area, comprising the steps of:
   providing an apparatus comprising:
      a bottom having a periphery;
      at least one wall extending upwardly from said periphery to define with said bottom an open-topped cavity;
      a non-closable access opening in said at least one wall, said access opening being located and sized such that cartons located within said cavity will not readily fall from said opening but may be easily removed therefrom manually, an upper edge of said opening being spaced below an upper edge of said at least one wall and a lower edge of said opening being spaced above said bottom; and
      means permitting movement of said apparatus with respect to the ground;
   moving said apparatus to said product display area;
   placing emptied cardboard shipping cartons within said apparatus in a jumbled configuration to a level above said lower edge of said opening;
   moving said apparatus to a location in proximity to said check out area and accessible to individuals seeking to reuse said cartons;
   at relatively widely spaced time intervals manually removing at least one of said cartons, but less than all of said cartons, from said apparatus via said access opening for use by said individuals while maintaining the remainder of said cartons within said apparatus for storage; and
   immediately placing items from said checkout area which have been purchased by the individual into said at least one carton.

2. A method as in claim 1, wherein said providing step further comprises said periphery being rectangular and said at least one wall comprising a pair of side walls, a back wall and a front wall, and said access opening being formed in said front wall.

3. A method as in claim 2, wherein said providing step further comprises said opening being approximately 117 cm wide by 60 cm high.

4. A method as in claim 2, wherein said providing step further comprises each of said bottom and said walls being comprised of a rigid peripheral frame and a support lattice extending thereacross.

5. A method as in claim 4, wherein said providing step further comprises said opening being approximately 117 cm wide by 60 cm high.

6. A method as in claim 5, wherein said providing step further comprises said bottom being approximately 117 cm by 61 cm and said cavity having a height of approximately 183 cm, and the upper edge of said access opening being 46 cm from the upper edge of said front wall.

* * * * *